United States Patent
Ledermann et al.

(10) Patent No.: US 9,049,269 B2
(45) Date of Patent: *Jun. 2, 2015

(54) METHOD FOR GROUPING AND TRANSMITTING MULTIMEDIA DATA

(71) Applicant: Swisscom AG, Bern (CH)

(72) Inventors: Daniel Ledermann, Niederscherli (CH); Souheil Ben Yacoub, Jeuss (CH); Beat Herrmann, Bern (CH); Denis Schlauss, Ostermundigen (CH)

(73) Assignee: Swisscom AG, Bern (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,345

(22) Filed: Apr. 9, 2013

(65) Prior Publication Data

US 2013/0232225 A1 Sep. 5, 2013

Related U.S. Application Data

(63) Continuation of application No. 13/451,142, filed on Apr. 19, 2012, now Pat. No. 8,418,218, which is a continuation of application No. 10/415,888, filed on May 9, 2003, now Pat. No. 8,230,461.

(51) Int. Cl.
| | |
|---|---|
| *H04N 7/10* | (2006.01) |
| *H04N 5/445* | (2011.01) |
| *H04L 29/06* | (2006.01) |
| *H04N 21/25* | (2011.01) |
| *H04N 21/232* | (2011.01) |
| *H04N 21/258* | (2011.01) |
| *G06F 17/30* | (2006.01) |
| *H04L 29/08* | (2006.01) |

(52) U.S. Cl.
CPC .............. *H04L 65/60* (2013.01); *H04N 21/251* (2013.01); *H04N 21/232* (2013.01); *H04N 21/25891* (2013.01); *G06F 17/30017* (2013.01); *H04L 29/06* (2013.01); *H04L 67/306* (2013.01); *H04L 67/2842* (2013.01); *H04L 69/329* (2013.01)

(58) Field of Classification Search
CPC .............. H04N 21/232; H04N 21/251; H04N 21/25891
USPC ................................................. 725/46, 47, 52
See application file for complete search history.

(56) References Cited

U.S. PATENT DOCUMENTS

| | | | | |
|---|---|---|---|---|
| 5,619,247 | A | * | 4/1997 | Russo ........................... 725/104 |
| 6,076,166 | A | * | 6/2000 | Moshfeghi et al. ............... 726/4 |
| 6,598,229 | B2 | * | 7/2003 | Smyth et al. .................. 725/107 |

(Continued)

*Primary Examiner* — Pankaj Kumar
*Assistant Examiner* — Franklin Andramuno
(74) *Attorney, Agent, or Firm* — McAndrews, Held & Malloy

(57) ABSTRACT

A method for data communication is provided and may include storing multimedia data in a first database, the multimedia data being associated with enhanced metadata stored in the first database. The enhanced metadata may be created based on at least a user profile stored at a central management unit. Multimedia data may be selected from the first database based on at least the enhanced metadata, and the selected multimedia data may be modified to produce user-specific multimedia data. The user-specific multimedia data may be stored in a second database and may be communicated from the second database to a user terminal. An alarm to a user interface of the user terminal may be generated, if in producing the user-specific multimedia data from the profiled multimedia data, it was not possible to generate the user-specific multimedia data in conformance with the user specific hardware or network characteristics.

44 Claims, 1 Drawing Sheet

(56) References Cited

U.S. PATENT DOCUMENTS

| | | |
|---|---|---|
| 6,628,302 B2 * | 9/2003 | White et al. .................. 715/717 |
| 6,868,088 B2 * | 3/2005 | Gibson et al. ................. 370/419 |
| 7,047,309 B2 * | 5/2006 | Baumann et al. ............. 709/232 |
| 7,209,942 B1 * | 4/2007 | Hori et al. ..................... 709/203 |
| 7,630,986 B1 * | 12/2009 | Herz et al. ............................. 1/1 |
| 2002/0112035 A1 * | 8/2002 | Carey et al. ................... 709/219 |

* cited by examiner

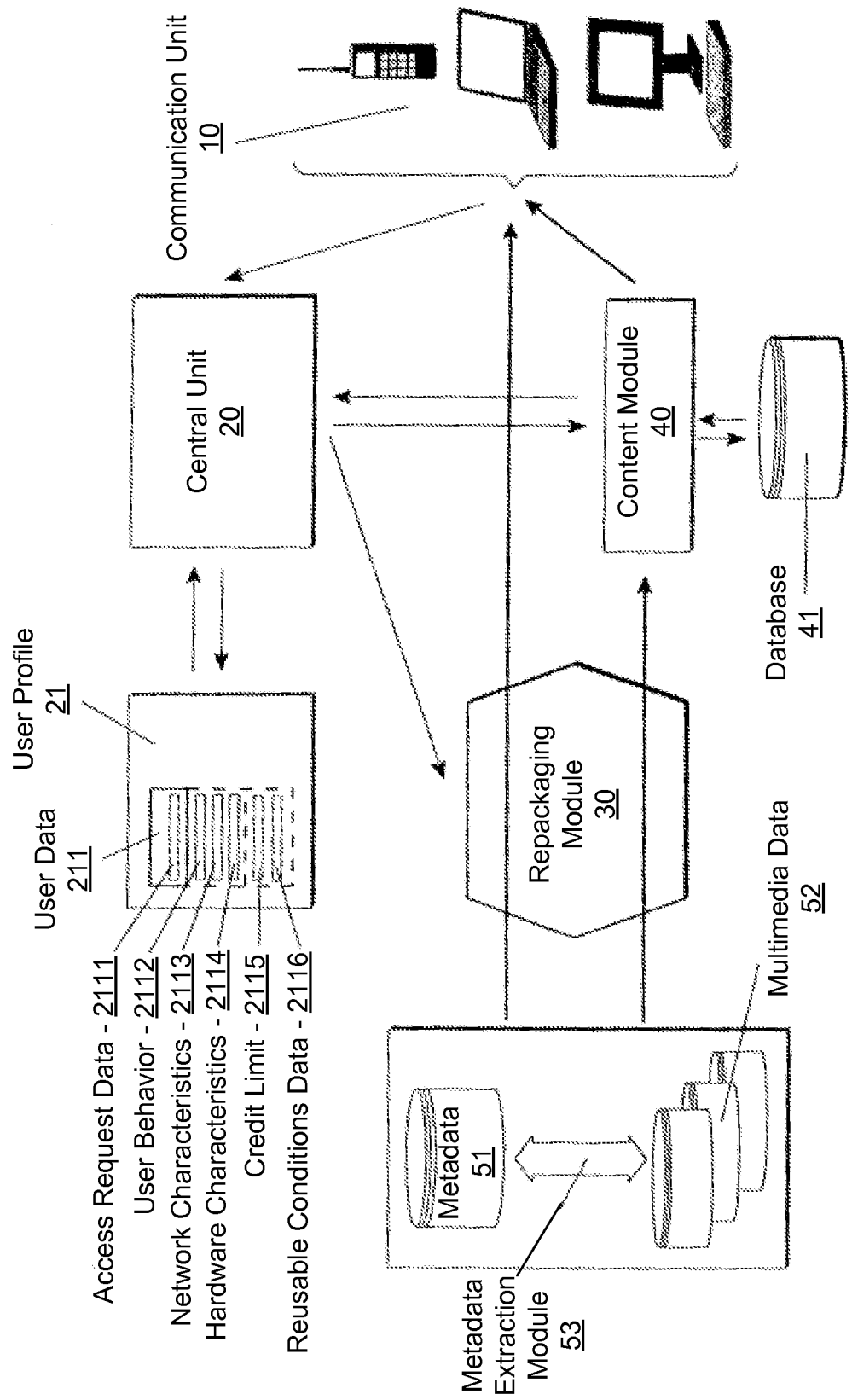

METHOD FOR GROUPING AND TRANSMITTING MULTIMEDIA DATA

This application is a continuation of application Ser. No. 13/451,142 filed on Apr. 19, 2012, which is a continuation of U.S. application Ser. No. 10/415,555 filed on May 9, 2003, which is the National Stage of PCT Application No. PCT/CH00/00597 filed on Nov. 9, 2000, the entire contents of which are incorporated herein.

The present invention relates to a method for the aggregation and the transmission of multimedia data, in which method metadata is assigned to multimedia data, a user profile is established utilizing user information and multimedia data is transmitted from a central unit to a communication device of a user. Particularly, the present invention relates to a method for the aggregation and transmission of multimedia data to various receiving devices of a user.

Currently worldwide, continually more computer and communications systems are made to retrieve or transmit multimedia data over networks, as for example a LAN (Local Area Network), a WAN (Wide Area Network) or the Internet via for example the PSTN (Public Switched Telephone Network) or a mobile radio network (PLMN: Public Land Mobile Network), for example GSM network (Global System for Mobile Communication) or UMTS network (Universal Mobile Telephone System) etc. Particularly, multimedia data are displayed and/or edited and/or are made available to other modified computer systems. Multimedia data include, among others, digital data such as text, graphics, pictures, animations, video, Quicktime and sound recordings. MPx (MP3) or MPEGx (MPEG7) standards, as defined by the Moving Pictures Expert Group, also belong to multimedia data. The amount of data arising from the transmission of multimedia data is, however, in most cases enormous. Despite the strenuous efforts from the side of industry toward to extension of the existing network, so far it is unable to keep pace with the growing demand for more efficient networks and greater transmission bandwidths. The situation has been contributed to, in recent years, by the fast growing popularity of services such as the Internet, the demand for multimedia "on demand", for example video films or programs/data and network compatible multi-user games etc. Consequently, greater numbers of users and larger amounts of data per user are the triggers, bringing the network repeatedly to the limits of capacity. Additionally, the costs for the use of the network are still too high in comparison to the price of the retrieved multimedia data. Belonging to the disadvantages for the extension of the existing network is that such an extension is time consuming and proportionally expensive. Attempts to carry the flood of data over other channels, as for example broadcast systems (i.e. Digital Audio Broadcasting DAB or Digital Video Broadcasting), over which broadcasters send unidirectional digital audio respectively video programs (television programs) and digital data and program associated data (Program Associated Data, PAD) to broadcast receivers, have up until the present not been able to really break through. A typical example of broadcasting is the carrying of controlled access films over broadcast systems. The characteristic unidirectional sending of these broadcast systems has, among others, the disadvantage that especially the broadcasting by means of radio waves is lacking a return channel from the broadcast receiver to the broadcast sender, respectively to its operator. As a result of this missing return channel, the possibilities for the settling of accounts for controlled access programs and/or data are limited (for example to subscriptions). The settling of accounts per subscription is, however, often not advantageous for the user because the user is not able to spontaneously retrieve controlled access programs and/or data for which they have not taken out a subscription. A further disadvantage for the settling of accounts per subscription is that the providers, respectively the operators of the broadcast sender, obtain no direct information about which subscribed services were also actually retrieved by the user. In the view of the user the settling of accounts seems not to be a fair method of accounting since they must pay for a subscription independent of whether they have retrieved the subscribed services or not. Especially for operators of small broadcast senders, respectively for small providers of controlled access programs and/or data, the expenditure for the administration of such subscriptions and for the settling of accounts of such services is costly. However, one of the biggest disadvantages is that only very imprecise data is available for the providers about the behaviour of the user. This makes it difficult for the provider to adapt quickly to wishes or changed behaviour of the user. In summary, it can be said that exact statistical and individual data about the behaviour of the user and a simple inexpensive system for settling of accounts via a reasonably priced bi-directional network (interactivity user—multimedia provider) is important and decisive for multimedia providers. These demands are not satisfied by the state of the art in the required manner. The document Mohan Rakesh, Smith John R. and Li chung-Sheng: Content Adaptation Framework: Bringing the Internet to Information Appliances', GLOBECOM 99 shows a system, by means of which content adapted data can be transmitted over the Internet to a user. With that the transmitted data quantity allows itself to be reduced to the required amount. The European Patent document EP 0905939 A2 likewise shows a system for reducing the amount of data to be transmitted. The data could among others be coded and compressed for this purpose by the system. The US patent document U.S. Pat. No. 6,049,831 reveals a system, which adapts the data respectively translates it into the proper format corresponding to the end device of the user and the software used by the user. The system changes the conditions corresponding to the end device of the user and thereby allows the user to change the end device without problems. The international patent publication WO 98/43177 of the prior art shows a system, which chooses, extracts and specifically adapts dynamic data out of the database, in which these data are transmitted to the user of the system. The behavior of the user can thereby be captured and influence, if necessary, the extraction behavior of the system.

It is an objective of the present invention to propose a new and better method appropriate for the transmission of multimedia data. Particularly, the settling of accounts for the retrieved multimedia data and the recording of the behaviour of the user with an acceptable price to performance ratio should be possible, the locating and the retrieving of multimedia data be simplified for the user and the method should not show the above cited disadvantages of the state of the art. A further objective of the invention is to create an active push method for the personalized aggregation of multimedia data by the system without the user having to be active in the process in advance.

According to the invention, these objectives are achieved, in particular, through the elements of the characterizing part of the independent claims. Further advantageous embodiments follow moreover from the dependent claims and from the specification.

In particular these objectives are attained through the invention in that metadata is assigned to multimedia data, a user profile is established utilizing user information and multimedia data utilizing the assigned metadata and based on the user profile is selected, in which the metadata is at least partially produced through automatic analysis of the multimedia data based on the content of the multimedia data, in which the user profile is generated at least partially, dynamically, from which data of the user profile portions are able to be modified by the user, and in which content oriented and optimized user specific multimedia data is produced out of the said selected multimedia data by means of a repackaging module in consideration of the data of the user profile, which content oriented and user specific optimised multimedia data is transmitted from a central unit to a communication device of the assigned user of the user profile. In particular, the advantage of this invention is that an optimisation of the transmission of multimedia is achieved without the existing network having to be extended. This has the advantage that the invention offers a more reasonably priced and faster improvement without the user having to experience a reduction with regard to the quality or quantity of the transmitted information. A further advantage is the time intensive searching and compilation of the data, in particular multimedia data, is much simplified for the user in larger networks and the user is additionally able to receive a dynamic preselection or summary established by the system (i.e. the user receives for example active proposals for possible search actions from the system) and an automation of the search directly influenced by the user.

In an embodiment variant the metadata is at least partially, dynamically generated, in which the dynamic generation will be made at least partially based on user data of the user profile. One of the advantages of this embodiment variant is that the metadata is continuously current as is necessary for the user. Additionally, this is achieved without unnecessary consumption of system resources.

In an embodiment variant the user determines content oriented and user specific optimized multimedia data and/or references to multimedia data, which content oriented and user specific optimized multimedia data and/or references to multimedia data (as for example hyperlinks) are stored and made available in the database of the content module assigned to the user. The embodiment variant has among others the advantage that previously generated multimedia data must not be produced new each time for multiple uses by the user. This allows for faster access to the desired data with economy of the computing power. In particular, the search for multimedia data utilizing the generated metadata utilizing the defined, user specific references to multimedia data is enlarged.

In an embodiment variant the user manages the data that are stored in the user assigned data store of the content module at least partially himself. Management intends to refer to for example, in addition to the direct access, the deleting or the editing of storage parameters. This has among others the advantage that the user is able to directly influence the storage of the data in the content module.

In an embodiment variant the user specific data about network characteristics and/or data about hardware characteristics of the communication device of the user and/or data about user behavior in the user profile is stored. This embodiment variant has the same advantages as the first embodiment variant.

In a further embodiment variant the repackaging module optimizes the selected multimedia data in view of the user specific user data in such a way that the data are fit to the demands of the communication device of the user and/or the communication connection from the central unit to the said communication device. This embodiment variant has likewise the same advantages as the first embodiment variant.

In an embodiment variant content oriented and user specific optimized multimedia for different communication devices of the user stored is made available in the content module of the central unit of the user. In particular, this is meaningful for embodiment variants where the user is able to define several user profiles for different communication devices. An advantage of this embodiment variant is that the user is able therewith to manage centrally several completely different communication devices. In that way he is able to, for example over a comfortable interface of a computer system, determine and manage in the central unit the multimedia data already delivered for one of a different kind of communication device such as a WAP and/or SMS compatible mobile radio device.

A further embodiment variant the user profile comprises access conditions data, which stipulates the monetary value of a credit limit definable by one of the user and/or the central unit, to which credit limit an automatic billing of the retrieved, content oriented and user specific optimized multimedia data takes place. This has among others the advantage that with the recompense for access to the content oriented and user specific optimized multimedia data the user or the central unit is able to be freely define, as to which kind of accounting to which payment amounts should be made.

In a further embodiment variant the central unit records automatic and/or dynamic data about the user behaviour and stores them assigned to the user profile. This has for example the advantage that statistical inquiries about user behaviour are able to be carried out centrally and multimedia providers are able to react quickly to changed user behaviour.

In an embodiment variant the user profile consists of fixed reusable conditions data of the user and/or the central unit, based upon which fixed reusable conditions data the central unit utilizes the user profile and makes it accessible to a third party. This embodiment variant has for example the advantage that the user can stipulate which level of data about his user behaviour or his user profile may be made accessible to a third party or may be used for statistical inquiries. For example, the provider can then introduce a bonus system for such users who allow more information about their user behaviour to be reused. Moreover, the provider is also able to react flexibly to the client behaviour and client wishes.

In an embodiment variant the user determines in advance the access request data of the user data for the purchase of content oriented and user specific optimized multimedia data, which access request data comprises an identification of the desired multimedia data and/or user specific details for the transmission of the desired multimedia data. This has among others the same advantage as above in that the user receives faster and more efficient access to the desired data (especially access controlled data) for different communication devices.

In a further embodiment variant, the multimedia data comprises programs (software) and/or program associated data. This embodiment variant has for example the advantage that the appropriate processing and display graphics programs or software for the content oriented and user specific optimized multimedia data are able to be downloaded in advance to the communication device of the user from the central unit.

In a further embodiment variant, the multimedia data comprises hyperlinks.

An embodiment of the present invention will be described in the following with reference to an example. The example of the embodiment is illustrated by FIG. 1, which shows a schematic block diagram of the method, in which multimedia data is personalized and user specifically optimized through a central unit.

FIG. 1 shows an embodiment example according to the present invention, in which embodiment example for the aggregation and the transmission of multimedia data by means of a central unit 20 to a communication unit 10 of a user multimedia data 52 is analyzed with regard to its content and metadata 51 based on the content of the multimedia data 52 is generated by the metadata extraction module 53, respectively is aggregated in a personalized way. According to the present invention the receiving device 10 is bi-directionally connected with a central unit 20 over a communication network. The communication network comprises for example a GSM or a UMTS network, or a satellite based mobile radio network, and/or one of several fixed networks, for example the public switched telephone network, the worldwide internet or a suitable LAN (local area network) or WAN (wide area network). Particularly, it also comprises an ISDN and an XDSL connection. Included in multimedia data are to be understood among others digital data such as text, graphics, pictures, cards, animation, moving pictures, video, Quicktime, sound recordings, programs (software), program associated data and hyperlinks or references to multimedia data. Also belonging are for example MPx (MP3) or MPEGx (MPEG4 or 7) standards, as they are defined by the moving picture expert group. The multimedia data 52 are able to be stored accessibly at different locations in different networks or locally for the central unit 20. The last named networks could include for example a LAN (local area network) or a WAN (wide area network), the Internet, broadcast cable networks, PSTN, PLMN or the like. The metadata 52 are extracted utilizing a content based indexing technique and are able to include keywords, synonyms, references to multimedia data (e.g. also hyperlinks), picture and/or sound sequences etc. Such systems are known in the state of the art in diverse variations. Examples for this are the US patent document U.S. Pat. No. 5,414,644, which describes a three-file-indexing technique or the US patent document U.S. Pat. No. 5,210,868, which additionally also store synonyms as such-keywords during the indexing of the multimedia data and the extraction of the metadata. In the present embodiment variant, the metadata are able to be at least partially produced dynamically (in real time) based upon user data of a user profile 21. This has for example the advantage that the metadata is always current and precise as useful for the user. There exists therefore a type of feedback possibility about the user behaviour at the communication device 10 to the metadata extraction module, which can directly influence the extraction. It could be however that so called agents are used particularly during the search for certain data. The said user profile 21 is established utilizing user information and stored in the central unit 20 assigned to the user. The central unit 20 generates content oriented and user specific optimized multimedia data 52 according to the user profile 21 and transmits it to the communication device 10 of the user. The user profile 21 remains permanently stored assigned to a particular user. The communication device 10 of the user can be for example a PC (personal computer), TV, PDA (personal digital assistant) or a mobile radio device (especially e.g. in combination with a broadcast receiver). The user profile 21 can comprise information about a user such as for example location of the communication unit 10 of the user in the network, identity of the user, user specific network characteristics 2113, user specific hardware characteristics 2114, data about the user behaviour 2112, etc. The user determines and/or modifies in advance of a purchase of multimedia data 52 at least portions of the user data 211 of the user profile 21. Naturally, he has equally the possibility to search and to access multimedia data through direct access, without having search and compilation help of the central unit in the network. The remaining data of the user profile 21 are able to be determined automatically by the central unit 20, by authorized third parties or likewise the user. Thus, the central unit 20 can include for example automatic connection recognition, user identification and/or automatic recording and analysis of the user behaviour (time of access, frequency of access, etc.). In an embodiment variant, these data about the user behaviour are able to be modified anew then by the user corresponding to his wishes. The multimedia data 52 are selected from the central unit 20 utilizing the assigned metadata 51 and based upon the user profile 21. Content oriented and user specific optimized multimedia data are produced subsequently from these said selected multimedia data 52 by means of a repackaging module 30 in consideration of the user profile 21 and in special cases the user data 211. For example, a user is interested in stock market data (or a single portion of the stock market data), the desired data are extracted from the general data found on the network, are compiled and optimized corresponding to the user profile 21 for example the user specific hardware characteristics 2114 or the network characteristics 2113 (e.g. compressed, sequenced, picture resolution or sound quality reduced). In an embodiment variant, the user has the possibility to determine access request data 2111 in the user profile 21 before the purchase of the multimedia data 52. The access request data 2111 can consist of for example time, data, type, terms, general descriptions (e.g. synonyms as well) and/or characteristics such as resolution etc. of the desired multimedia data. Thus, the user specific optimized and content oriented multimedia data are already supplied at the point in time of the access by the user. So that the data of the user profile for example regarding picture resolution are determined not only by the central unit 20, but also are able to be at least partially modified by the user (e.g. access request data 2111), special user wishes (e.g. regarding download times) can be given attention during the optimization. The above named process for the selection of multimedia data and sequences of multimedia data according to the user profile 21 or according to direct details of the user is understood under the personalization of multimedia data. It comprises particularly a content related compilation of data. The optimization to for example user specific network and/or hardware characteristics and/or user behaviour according to the user profile 21 is understood under user specific optimization of multimedia data. In an embodiment possibility, the user profile 21 consists of a credit limit 2115. The credit limit 2115 is one of the user and/or the central unit 20 and/or third party (e.g. banks, credit card companies, multimedia providers) definable monetary value and stipulates a maximum monetary value for the purchase of content oriented and user specific optimized multimedia data to be paid for, to which monetary value an automatic billing for the purchase of multimedia data is able to be carried out by the central unit 20. Upon exceeding the credit limit 2115 a check is initiated from the central unit 20 for example to the banking institution regarding the credit worthiness of the user. The credit limit 2115 can also serve the user as a protection against unforeseen costs for the purchase of multimedia data. In particular, the user is also able to access through the billing from third party providers access controlled multimedia data (conditional access) to be paid for over the central unit 20. The handling and management of the settling of accounts (billing) and/or access key are carried out by the central unit 20. The encryption and/or decoding of the access controlled multimedia data is achieved by means of an access controlled module of the repackaging module 30, in which for example distribution key and/or session key is able to be used according to the ETSI standard. According to the invention, the repackaging module 30 is able to be implemented by way of hardware or software. For the billing of the retrieved multimedia data, meaning the settling of accounts for the purchase of the data, corresponding settling of accounts data are generated by the central unit 20, which comprises for example receipts for the settling of accounts (e.g. electronically signed), similar to CDR receipts (call data records) with so called DUR receipts (DAB/DVB usage records). The receipts for the settling of accounts are transmitted from the central unit 20 for example to a clearing module of a credit card company, where they are further processed, or the central unit carries out the billing autonomously. The content oriented and user specific optimized multimedia data can also be provided with an electronic stamp, an electronic signature or an electronic watermark by means of the repackaging module 30. The electronic signature allows the content oriented and user specific optimized multimedia data to be assigned at any future point in time to the user, who has retrieved it from the central unit. The misuse of cost compulsory multimedia data can thereby be prevented. Particularly, the user profile 21 can also comprise reusable conditions data 2116, which are determinable by the user and/or the central unit 20 and/or authorized third parties (as e.g. the provider of multimedia data 52). Based upon the reusable conditions data 2116, the data of the user profile 21 are analyzed and made accessible to third parties (which can be in any case determined by the user or the central unit 20). The user in this way determines the protection of the data. The statistical analysis can be obtained generally as well as individually for the specific user. The central unit 20 functions thereby as an independent filter station for the data according to the reusable conditions data 2116. In particular, the reusable conditions data 2116 in combination with the billing allow bonus systems to be implemented based upon the reusable conditions data 2116 by means of the central unit 21. In this manner, for example the purchase fees for cost compulsory multimedia data can be reduced by the provider, when the user sets the reusable conditions data 2116 so that the provider is able to know more about the specific user behaviour. This gives the provider many advantages. In this manner he is able to react for example faster to changed specific user behaviour as well as general trends and to take these into consideration. Another application of this type of statistical analysis of the present invention is the possibility for the system using the said analysis to build communities or groups of users with the same or similar interests. This allows for example an optimized and perhaps more time and cost intensive aggregation of multimedia data through the system. An opposite approach is, if the system notes statistically that for example different users searched repeatedly and/or requested objects, which were not able to be found. If multimedia data with the desired content do not exist, it can be deduced that apparently a new interest or a demand for multimedia data with currently still unavailable content exists or a demand is in the process of developing. That allows the content provider to react quickly to new interests and create a respective market position for himself. The content oriented and user specific optimized multimedia data are stored in a database 41 of a content module 40 of the central unit 20 made available to the user. In this database 41 is not only the central unit 20 utilizing the user profile 21 able to store content oriented and user specific optimized multimedia data and/or references to the content oriented and user specific optimized multimedia data, but it also allows the user to store content oriented and user specific optimized multimedia data and/or references to the content oriented and user specific optimized multimedia data in the database 41. Consequently, the user receives indirectly for example via the access request data 2111 influence over the data already in the database 41 and directly in that he determines the said data (e.g. for multimedia data, which he intends to use at a later point in time). This allows the user to further optimize his time of access. The user is able to access the content oriented and user specific optimized data of the database 41 of the content module 40 with the communication device at any time or the central unit 20 carries out the download of the data to the communication device 10 at a prearranged point in time. The determination of the already compiled content oriented and user specific optimized multimedia data can take place depending on user interface for example with drag-and-drop or another selection mechanism. It can be convenient to integrate an alarm function into the system, making the user aware with the use of an alert, that important multimedia data would have been compiled utilizing the profile, but this data could not or was not able to be pushed by the system due to for example the choice of the end device respectively the communication device 10 (meaning e.g. that the multimedia viewed as important by the system do not comply with the technical necessities of the communication device 10). As an additional service, it can also be offered that upon the demands of the user the content or specific parts (e.g. determinable by the user) of the content of the database 41 of the content module 40 be stored on a physical medium, such as for example CD-Rom or DVD and be delivered to the user for example via the post.

It is important to point out, that the user has the possibility according to the present invention to define for himself several different user profiles 21 at the central unit 20 for different communication devices 10 and/or different network locations etc. In so doing he can define for example a user profile 21 for a mobile radio device, a user profile 21 for a PC and one for a PDA. Since the different user profiles 21 are each assigned to the same user, he is also able to commonly modify and manage the user profile from his different communication devices 10. In so doing he can determine access request data 2111 during the day at his employment on his PC, in order to access the multimedia data (stock market, weather, sport, etc.) according to the predefined access request data 2111 later on the way home with his mobile radio device. The central unit 20 functions as a central management element, which allows the user to manage his different end devices and the desired multimedia data in a convenient manner. Through this reciprocal access, a widest possible optimization with most minimal network load and greatest user comfort is achieved. Since the user receives a permanently, assigned, stored user profile 21 in the central unit 20, the central unit 20 also has the possibility to take into consideration load peaks for the performance of calculation and/or network transmission (time, transmission channel etc.). On the other hand, it is important to note that with the present invention an active from the system push-situation is created by the system for the user without the user having to be active himself, meaning the data is compiled by the system without further user intervention utilizing his user profile 21 and if it is the planned case independently transmitted. This can take into consideration as with automatic device recognition for example the time of the user behaviour for different communication devices (end devices) by the same user etc. It is also possible to imagine that the system is used for the personalized creation of multimedia advertising data or to integrate such data into multimedia data demanded by the user. It must be pointed out that the method may not be viewed as limited in its scope of protection in any way through the example mentioned here.

LIST OF REFERENCE NUMERALS

10 Communication device
20 Central unit

21 User profile
   211 data able to be determined by the user
      2111 Access request data
      2112 Data based upon user behaviour
      2113 User specific data about network characteristics
      2114 User specific data about hardware characteristics
      2115 Credit limit
      2116 Reusable conditions data
30 Repackaging module
40 Content module
41 Database
51 Metadata
52 Multimedia data
53 Metadata extraction module

The invention claimed is:

1. A method for selection and transmission of multimedia data, the method comprising:
storing multimedia data in a first database, the multimedia data being associated with metadata stored in said first database;
creating assigned metadata based on at least a user profile;
associating the assigned metadata to the multimedia data;
selecting multimedia data from the first database based on at least the assigned metadata;
modifying said selected multimedia data to produce user-specific multimedia data;
storing the user-specific multimedia data in a second database; and
communicating the user-specific multimedia from the second database to a user terminal.

2. The method according to claim 1, comprising generating an alarm to a user interface of the user terminal, if in said producing the user-specific multimedia data from said selected multimedia data it was not possible to generate the user-specific multimedia data in conformance with one or both of: user specific hardware characteristics and user specific network characteristics.

3. The method according to claim 1, comprising selectively producing user-specific multimedia data optimized for different terminal devices based on multiple hardware profiles from the selected multimedia data, and wherein the user profile comprises multiple hardware profiles for different terminal devices accessible to the user.

4. The method according to claim 1, comprising encrypting the user-specific multimedia data that is stored in the second database.

5. The method according to claim 1, comprising analyzing user behavior history of accessing the user-specific multimedia data to store reusable conditions data in the user profile and reducing a purchase fee for the user-specific multimedia data based on the reusable conditions data.

6. The method according to claim 1, wherein the modifying is based on network load optimization.

7. The method according to claim 1, wherein metadata associated with said assigned metadata comprises context-based keywords relating to the multimedia data.

8. The method according to claim 1, comprising creating the assigned metadata as a result of a search for multimedia data by a search agent at a central management unit that stores the user profile.

9. The method according to claim 1, comprising creating the enhanced metadata as a result of a search for multimedia data by a search agent at a central management unit that stores the user profile.

10. The method according to claim 1, wherein the modifying of the multimedia data is based on one or both of: user specific hardware characteristics and user specific network characteristics, and wherein the user specific hardware characteristics and user specific network characteristics are stored in the user profile.

11. The method according to claim 10, wherein the user specific hardware characteristics include information on a picture resolution and a compression scheme, and said producing user-specific multimedia data comprises converting the selected multimedia data to user-specific multimedia data by applying the compression scheme and the picture resolution.

12. A system for selection and transmission of multimedia data, said system comprising a first database, a central management unit, a repackaging module, and a second database, wherein said system is operable to:
store multimedia data in a first database, the multimedia data being associated with metadata stored in said first database;
create assigned metadata based on at least a user profile;
associate the assigned metadata to the multimedia data;
select multimedia data from the first database based on at least the assigned metadata;
modify said selected multimedia data to produce user-specific multimedia data;
store the user-specific multimedia data in a second database; and
communicate the user-specific multimedia from the second database to a user terminal.

13. The system according to claim 12, wherein said system is operable to generate an alarm to a user interface of the user terminal, if in said producing the user-specific multimedia data from said selected multimedia data it was not possible to generate the user-specific multimedia data in conformance with one or both of: user specific hardware characteristics and user specific network characteristics stored in the user profile.

14. The system according to claim 12, wherein said system is operable to selectively produce user-specific multimedia data optimized for different terminal devices based on multiple hardware profiles from the selected multimedia data, and wherein the user profile comprises multiple hardware profiles for different terminal devices accessible to the user.

15. The system according to claim 12, wherein said system is operable to encrypt the user-specific multimedia data that is stored on the second database.

16. The system according to claim 12, wherein said system is operable to analyze user behavior history of accessing the user-specific multimedia data to store reusable conditions data in the user profile and reducing a purchase fee for the user-specific multimedia data based on the reusable conditions data.

17. The system according to claim 12, wherein the modifying is based on network load optimization.

18. The system according to claim 12, wherein metadata associated with said assigned metadata comprises context-based keywords relating to the multimedia data.

19. The system according to claim 12, wherein said system is operable to create the assigned metadata as a result of a search for multimedia data by a search agent at a central management unit that stores the user profile.

20. The system according to claim 12, wherein said system is operable to create the enhanced metadata as a result of a search for multimedia data by a search agent at a central management unit that stores the user profile.

21. The system according to claim 12, wherein the modifying of the multimedia data is based on one or both of: user specific hardware characteristics and user specific network characteristics, and wherein the user specific hardware characteristics and user specific network characteristics are stored in the user profile.

22. The method according to claim 21, wherein the user specific hardware characteristics include information on a picture resolution and a compression scheme, and said producing user-specific multimedia data comprises converting the selected multimedia data to user-specific multimedia data by applying the compression scheme and the picture resolution.

23. A method for selecting and transmission of multimedia data, the method comprising:
    storing multimedia data in a first database, the multimedia data being associated with metadata;
    creating assigned metadata based on at least a user profile;
    associating the assigned metadata to the multimedia data;
    selecting multimedia data based on at least the assigned metadata;
    modifying said selected multimedia data to produce user-specific multimedia data;
    storing the user-specific multimedia data in a second database; and communicating the user-specific multimedia to a user terminal.

24. The method according to claim 23, comprising generating an alarm to a user interface of the user terminal, if in said producing the user-specific multimedia data from said selected multimedia data it was not possible to generate the user-specific multimedia data in conformance with one or both of: user specific hardware characteristics and user specific network characteristics.

25. The method according to claim 23, comprising selectively producing user-specific multimedia data optimized for different terminal devices based on multiple hardware profiles from the selected multimedia data, and wherein the user profile comprises multiple hardware profiles for different terminal devices accessible to the user.

26. The method according to claim 23, comprising encrypting the stored user-specific multimedia data.

27. The method according to claim 23, comprising analyzing user behavior history of accessing the user-specific multimedia data to store reusable conditions data in the user profile and reducing a purchase fee for the user-specific multimedia data based on the reusable conditions data.

28. The method according to claim 23, wherein the modifying is based on network load optimization.

29. The method according to claim 23, wherein metadata associated with said assigned metadata comprises context-based keywords relating to the multimedia data.

30. The method according to claim 23, comprising creating the assigned metadata as a result of a search for multimedia data by a search agent at a central management unit.

31. The method according to claim 23, comprising creating the enhanced metadata as a result of a search for multimedia data by a search agent at a central management unit.

32. The method according to claim 23, wherein the modifying of the multimedia data is based on one or both of: user specific hardware characteristics and user specific network characteristics, and wherein the user specific hardware characteristics and user specific network characteristics are stored in the user profile.

33. The method according to claim 32, wherein the user specific hardware characteristics include information on a picture resolution and a compression scheme, and said producing user-specific multimedia data comprises converting the selected multimedia data to user-specific multimedia data by applying the compression scheme and the picture resolution.

34. A system for selection and transmission of multimedia data, said system comprising:
    one or more processors, wherein said one or more processors is operable to:
        store multimedia data in a first database, the multimedia data being associated with metadata;
        create assigned metadata based on at least a user profile;
        associate the assigned metadata to the multimedia data;
        select multimedia data based on at least the assigned metadata;
        modify said selected multimedia data to produce user-specific multimedia data;
        store the user-specific multimedia data in a second database; and
        communicate the user-specific multimedia to a user terminal.

35. The system according to claim 34, wherein said one or more processors is operable to generate an alarm to a user interface of the user terminal, if in said producing the user-specific multimedia data from said selected multimedia data it was not possible to generate the user-specific multimedia data in conformance with one or both of user specific hardware characteristics or user specific network characteristics stored in the user profile.

36. The system according to claim 34, wherein said one or more processors is operable to selectively produce user-specific multimedia data optimized for different terminal devices based on multiple hardware profiles from the selected multimedia data, and wherein the user profile comprises multiple hardware profiles for different terminal devices accessible to the user.

37. The system according to claim 34, wherein said one or more processors is operable to encrypt the stored user-specific multimedia data.

38. The system according to claim 34, wherein said one or more processors is operable to analyze user behavior history of accessing the user-specific multimedia data to store reusable conditions data in the user profile and reducing a purchase fee for the user-specific multimedia data based on the reusable conditions data.

39. The system according to claim 34, wherein the modifying is based on network load optimization.

40. The system according to claim 34, wherein metadata associated with said assigned metadata comprises context-based keywords relating to the multimedia data.

41. The system according to claim 34, wherein said one or more processors comprises a central management unit, and said system is operable to create the assigned metadata as a result of a search for multimedia data by a search agent at a central management unit that stores the user profile.

42. The system according to claim 34, wherein said one or more processors comprises a central management unit, and said system is operable to create the enhanced metadata as a result of a search for multimedia data by a search agent at a central management unit that stores the user profile.

43. The system according to claim 34, wherein the modifying of the multimedia data is based on one or both of: user specific hardware characteristics and user specific network characteristics, and wherein the user specific hardware characteristics and user specific network characteristics are stored in the user profile.

44. The method according to claim 43, wherein the user specific hardware characteristics include information on a picture resolution and a compression scheme, and said producing user-specific multimedia data comprises converting the selected multimedia data to user-specific multimedia data by applying the compression scheme and the picture resolution.

* * * * *